United States Patent [19]

Smith, III

[11] 4,046,395

[45] Sept. 6, 1977

[54] METHOD AND APPARATUS FOR REDUCING VEHICLE SIDE SWAY

[76] Inventor: Paul W. Smith, III, P.O. Box 868, Burbank, Calif. 91503

[21] Appl. No.: 626,900

[22] Filed: Oct. 29, 1975

[51] Int. Cl.² .............................................. B62D 21/00
[52] U.S. Cl. ........................... 280/106.5 R; 267/54 R; 280/112 R; 280/689
[58] Field of Search ............... 280/111, 112 R, 112 A, 280/106 R, 106.5 R, 689; 267/54 R

[56] References Cited

U.S. PATENT DOCUMENTS

| 696,288 | 3/1902 | White | 280/112 R |
|---|---|---|---|
| 1,475,941 | 12/1923 | Durant | 267/54 R |
| 1,601,480 | 9/1926 | Rollman | 280/111 |
| 1,678,930 | 7/1928 | Andren | 267/54 R |
| 1,691,959 | 11/1928 | Coleman | 280/112 R |
| 2,002,459 | 5/1935 | Viviano | 280/112 R |
| 3,140,879 | 7/1964 | Schaefer | 280/112 R |
| 3,243,198 | 3/1966 | Simovich | 280/112 R |
| 3,567,243 | 3/1971 | Ruhlin | 280/112 R |

Primary Examiner—Joseph F. Peters, Jr.
Assistant Examiner—John A. Carroll

[57] ABSTRACT

A control arm is provided which is adapted to be connected to the frame of a motor home which is subject to side sway due to the twisting of the vehicle frame side-rails where the motor home utilizes leaf spring suspension systems. The control arm includes two rigid end members, each having a connecting portion extending inwardly and downwardly at an acute angle of about 45° to the horizontal, and a rigid cross member rigidly secured between the end members to the connecting portions. The cross member has connecting portions rigidly secured to the connecting portions of the end members and extending upwardly and outwardly at an acute angle of about 45° to the horizontal. The cross member depends from the end members underneath the vehicle's transmission when the control arm end members are connected to the frame side-rails.

The control arm is installed by first straightening the frame side-rails adjacent the rear-spring shackle plates of the vehicle's front springs if the side-rails are twisted. The end members of the control arm are then rigidly secured, by welding or the like, to the rearward edge of the rear spring shackle plates of the front springs. The end members also abut the lower edge of the side-rails so that the side-rails and end members may be welded together along that edge if desired.

12 Claims, 5 Drawing Figures

METHOD AND APPARATUS FOR REDUCING VEHICLE SIDE SWAY

BACKGROUND OF THE INVENTION

This invention relates to a vehicle control arm, and particularly to a method and apparatus for substantially reducing sway of heavy vehicles, such as motor homes, which employ a leaf spring suspension system.

Although this invention will be described in connection with motor homes, it will be understood that the invention is applicable to various other types of vehicles which employ leaf springs in their suspension system and which have similar load and size characteristics. The side sway of such vehicles has been found to be a source of irritation and a considerable safety hazard. For example, with some types of motor homes a great deal of side-to-side movement is developed when the motor home is being driven at highway speeds or is subjected to relatively high wind loads, such as when a large truck passes the motor home. Such side sway necessitates constant correction by the driver which produces an side-to-side oscillating movement, all of which can become extremely dangerous.

Numerous attempts have been made to correct this problem, and in fact others have unsuccessfully employed control arms of various types at various locations on the frames of such vehicles. These prior attempts were based on the recognition that such vehicles are improperly braced between the side-rails of the frame. As a result of this improper bracing, the rails twist when loads are applied to the frame. It is this twisting of the frame side-rails which causes the body swaying and the resulting inadvertent turning of the front wheels.

In spite of all of prior attempts, however, no one else has yet been able to provide a control arm which will substantially reduce this problem. I have, however, discovered such a control arm and the proper positioning of this arm which will substantially reduce this previously uncontrollable side-sway motion.

SUMMARY OF THE INVENTION

A rigid arm is provided to substantially reduce the side-sway of heavy vehicles due to twisting of the vehicle side-rails where such vehicles utilize a leaf spring suspension secured by shackle plates to the side-rails of the vehicle frame. The arm is connected at its opposite ends to the frame side-rails adjacent the rear spring shackle plates of the front leaf springs at or immediately rearward of the vertical center line of the shackle plates.

In one embodiment of this invention, the arm includes two rigid end members respectively connected to the opposed side-rails. Each end member has a connecting portion extending inwardly and downwardly at an acute angle of about 45° to the horizontal. A rigid cross member is secured between the end members and depends downwardly from the end members when the arm is mounted in position. The cross member also has connecting portions rigidly secured to the end member connecting portions outwardly and upwardly at an acute angle of about 45° to the horizontal. The arm is secured to the side-rails or to the rear shackle plates of the front leaf springs.

When installing the arm, the side-rails are straightened, if they are twisted, in the area adjacent the rear shackle plates of the front leaf springs.

BRIEF DESCRIPTION OF THE DRAWING

In the drawing, which constitutes a part of this specification, exemplary embodiments demonstrating various features of this invention are shown wherein.

DESCRIPTION OF PREFERRED EMBODIMENTS

Figure 1:
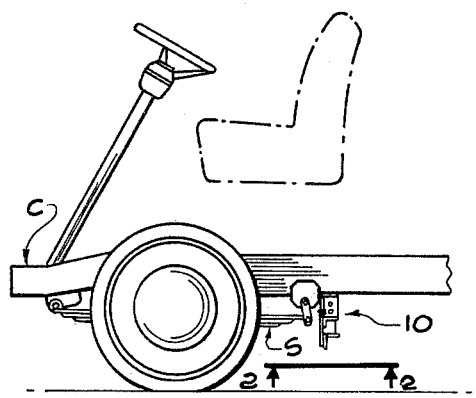
FIG. 1 is a partial elevational view of the frame and associated components of a mobile home.
Figure 2:
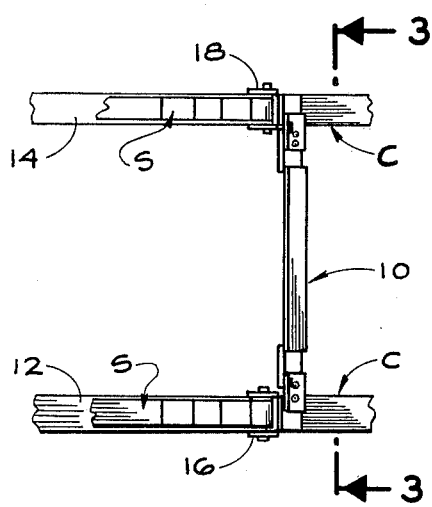
FIG. 2 is a plan view of the a portion of the underside of such a vehicle frame taken along the line 2—2 of FIG. 1 and shows the control arm of a first embodiment of this invention installed on the frame.

Referring to FIGS. 1 and 2, the forward portion of a vehicle chassis C is shown including a forward conventional leaf spring supporting system S. The control arm 10 of the first embodiment of this invention, described in detail below, is transversely disposed between the opposed frame side-rails 12 and 14 of the chassis C and is secured adjacent the rear shackle or plates 16 and 18 of the forward leaf spring system S to insure travelling stability.

Figure 3:
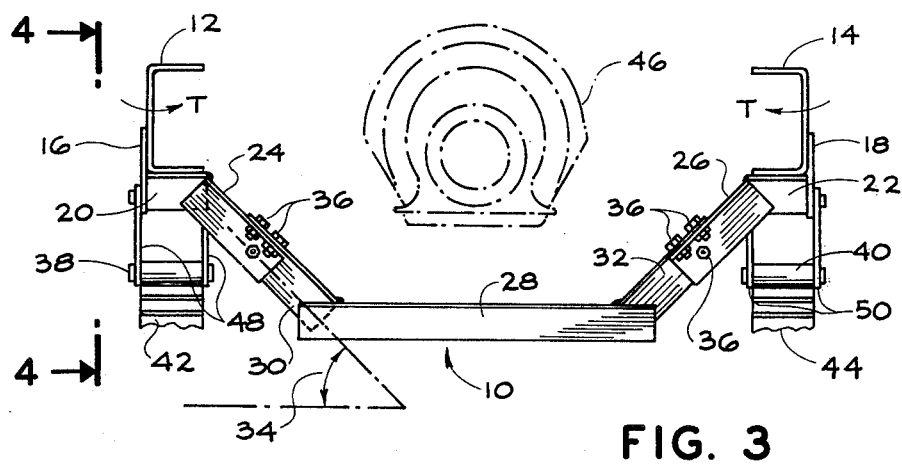
FIG. 3 is cross-sectional elevational view looking from back to front of such a vehicle frame and taken along the line 3—3 of FIG. 2.

As is shown in detail in FIG. 3, the control arm 10 includes two rigid end members 20 and 22 each having a connecting portion 24 and 26, respectively, extending inwardly and downwardly at an acute angle 34 of about 45° to the horizontal plane of the vehicle. A rigid cross member 28 is rigidly secured between the end members and depends therefrom. The cross member 28 has opposed connecting portions 30 and 32 extending upwardly and outwardly at an acute angle 34 of about 45° to the horizontal plane of the vehicle. The cross member connecting portions 30 and 32 are rigidly secured to the end member connecting 24 and 26, respectively, by means of bolts 36. The bolts 36 allow removal of the cross member 28 from the end members 20 and 22 to permit repair and replacement of the vehicle transmission 46 without disconnecting the entire arm 10.

Although it is desirable to construct the control arm as one straight unit without any offset portions, this is normally not possible due to the other vehicle components which are disposed between the frame side-rails. Therefore, as previously indicated, the control arm 10 has an offset cross member which depends downwardly from the end members 20 and 22 to pass underneath the other vehicle components, such as the transmission 46. The angle 34 should be as shallow as possible. At zero degrees, for example, the control arm is a straight member providing the maximum force to counter the tendency of the frame side-rails 12 and 14 to twist in the direction of the arrows T shown in FIGS. 3 and 4. However, since in most cases the control arm 10 must allow for clearance of the other vehicle components positioned between the frame rails 12 and 14, and angle 34 of about 45° is normally employed. As this angle increases beyond 45°, the effectiveness of the control arm operation decreases unless the control arm is strengthened. Strengthening the control arm usually results in adding weight and expense in constructing the control arm 10. Because of the desirability of high strength-to-weight characteristics, the arm is preferably constructed of 3/16 inch thick steel angle iron, although other configurations may be utilized, such as channels iron, I-beams, or the like.

Figure 4:
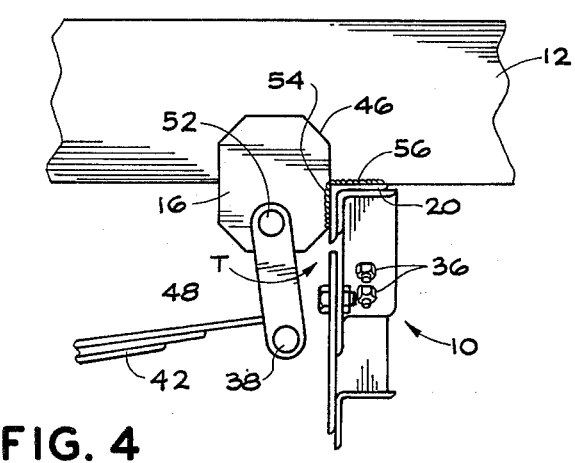
FIG. 4 is an elevational side view taken along the line 4—4 of FIG. 3.

As illustrated in FIGS. 3 and 4, the vehicle springs 42 and 44 are attached by hanger or shackle plates 16 and 18 to the frame side-rails 12 and 14, respectively. Bushings 38 and 40 connect the springs 42 and 44, respectively, to the shackle plates 16 and 18 through pairs of shackle arms 48 and 50 respectively. As is shown in FIG. 4, the shackle arms 48 are pivotly secured to the hanger plate 16 by a second bushing 52. The shackle arms 50 are secured to the hanger plate 18 by similar means (not shown). The shackle arms are normally angled rearwardly at about 30° when the vehicle is at rest. When the vehicle encounters bumps in the road during operation, the shackle plates tend to be pulled rearwardly as well as inwardly, as indicated by the arrows T in FIGS. 3 and 4. Proper utilization of the control arm 10 not only substantially eliminates rotation of the shackle plates and side-rails but substantially extends the life of the bushings.

In the first embodiment of this invention shown in FIGS. 3 and 4, the control arm 10 is installed by first straightening the frame side-rails adjacent the rear shackle plates 16 and 18 of the front leaf springs. This straightening may be accomplished by applying outward pressure to the lower edge of the side-rails or on the springs at the rear spring hanger plates 16 and 18 through the use of a hydraulic jack or the like. The control arm 10 is then positioned under the frame side-rails 12 and 14 and directly behind an abutting against the rear spring shackle plates 16 and 18. While in this position, the end member 20 is rigidly secured to the rear edge 46 of the shackle plate 16 by a weld 54. The portion of the end member 20 abutting the lower edge of the side-rail 12 may also be secured to the side-rail at that point by weld 56 if desired. The opposite end member 22 is similarly secured to the rear spring shackle plate 18, and to the frame side-rail 14 if desired.

I have discovered that in addition to positioning the control arm 10 transverse to the frame side-rails, the end members 20 and 22 must be connected to the vehicle frame at or immediately rearward of the vertical center line of said rear shackle plates of the front springs in order to eliminate the sway. Thus, in the first emodiment shown in FIGS. 3 and 4, the control arm 10 is positioned, to effectively absorb the side thrust generated by the tendency of the frame rails to twist by welding the control arm to the rearward edge 46 of the shackle plate 16 and in a similar position to shackle plate 18.

Figure 5:
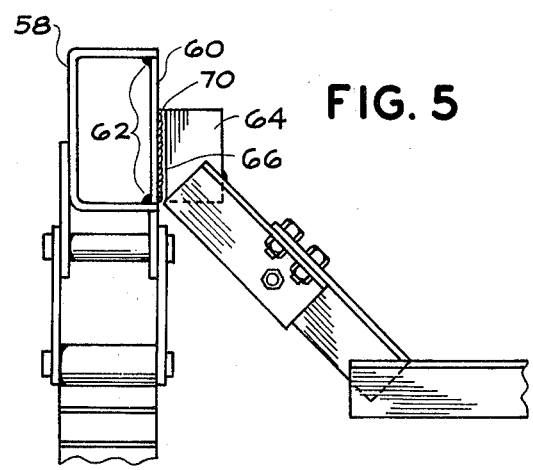
FIG. 5 is an elevational cross-sectional view of the frame shown in FIG. 1 looking from back to front and shows the control arm of a second embodiment of this invention installed on the frame.

In a second embodiment of this invention, shown in FIG. 5, the end members of the control arm 10 are secured directly to the frame side-rails at or immediately rearwardly of the vertical center line of the shackle plates. Thus, in FIG. 5 a plate 60 is secured to the open edges of frame side-rail 58 by welds 62 or the like. The end member 64 is rotated upwardly approximately 90° from the end member 20 shown in FIG. 3 such that one flange 66 of the end member 64 is secured to the plate 58 by a weld 70. The opposite end member is similarly secured to the opposed side-rail. The connecting portions and cross member are similar to those described in connection with the first embodiment.

While two particular embodiments have been disclosed herein, the present invention is not limited to such embodiments and one skilled in the art will recognize that various modifications and variations may be made within the scope of the invention. For example, various methods of securing may be employed as well as various types of structural shapes and materials.

What is claimed is:

1. An arm adapted to substantially reduce the side sway of a vehicle due to twisting of the vehicle frame side-rails where such vehicle utilizes leaf springs and spring shackle plates secured to the side-rails of the vehicle frame, said side-rails having a bottom flange, comprising:

a rigid arm rigidly connected at opposite ends to the rear shackle plates of the front leaf springs at or immediately rearward of the vertical center line of said shackle plates, said shackle plates being secured to straightened frame side-rails; and, means for connecting the arm to the bottom flanges of the respective side-rails to prevent said flanges from twisting.

2. An arm as defined in claim 1 wherein said arm is rigidly secured at opposite ends directly to the rearward edge of said shackle plates.

3. An arm as defined in claim 2 wherein said arm is also secured to the bottom flange of said side-rails adjacent the rearward edge of said shackle plates.

4. An arm as defined in claim 1 wherein said arm is secured at its opposite ends to the shackle plates in alignment with the vertical center line of the respective shackle plates.

5. An arm as defined in claim 1, wherein said arm comprises:

a rigid end member at each end of the arm adapted to be connected to said respective shackle plates, each end member having a connecting portion extending inwardly and downwardly an acute angle of about 80° or less to the horizontal; and, a rigid cross member rigidly secured between said end members, said cross member depending downwardly from said end members when said arm is connected to said shackle plates, said cross member having connecting portions rigidly secured to the end member connecting portions and extending outwardly and upwardly at an acute angle of about 10° or more to the horizontal.

6. An arm as defined in claim 5 wherein said angles are each about 45°.

7. An arm as defined in claim 1, wherein said side-rails each have at least an upstanding flange rigidly secured to said bottom flange, and further comprising:

a closure plate rigidly securing each upstanding flange to the respective bottom flange in the area of said respective shackle plate, said arm being rigidly secured at opposite ends to said respective closure plates to thereby connect said arm to both the shackle plates and to the bottom flanges.

8. An arm as defined in claim 7, wherein each side-rail has a top flange spaced from said bottom flange and rigidly secured to said respective upstanding flange, said respective closure plates being rigidly secured between the free ends of said top and bottom flanges in the area of said respective shackle plates.

9. A method of substantially reducing the side sway of vehicles due to twisting of the vehicle frame side-rails where such vehicles utilize leaf springs and spring shackle plates secured to the side-rails of the vehicle frame, said side-rails having a bottom flange, comprising the steps of:

insuring that the side-rails are straight;

rigidly connecting the opposite ends of a rigid arm to the rear shackle plates of the front leaf springs at or immediately rearward of the vertical center line of said shackle plates; and, connecting the arm to the bottom flanges of the respective side-rails to prevent said flanges from twisting.

10. A method of substantially reducing the side sway of vehicles as defined in claim 9, wherein the step of connecting said arm to the shackle plates comprises rigidly securing the opposite ends of said arm directly to the respective shackle plates at or immediately rearward of the vertical center line of said shackle plates.

11. A method of substantially reducing the side sway of vehicles as defined in claim 9, wherein said step of connecting said rigid arm comprises rigidly securing the opposite ends of said arm to the rearward edge of said rear shackle plates.

12. A method of substantially reducing the side sway of heavy vehicles as defined in claim 11, comprising the further steps of:

rigidly securing the opposite ends of said arm to the bottom flange of said frame side-rails adjacent the rearward edge of said rear shackle plates.

* * * * *